(12) United States Patent
Kanagawa et al.

(10) Patent No.: US 7,641,968 B2
(45) Date of Patent: Jan. 5, 2010

(54) MOISTURE-CURABLE POLYURETHANE HOT MELT ADHESIVE AND MULTILAYER SHEET USING THE SAME

(75) Inventors: Yoshinori Kanagawa, Takaishi (JP); Toshio Niwa, Osaka (JP); Toshifumi Tamaki, Takaishi (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 12/302,237

(22) PCT Filed: Nov. 19, 2007

(86) PCT No.: PCT/JP2007/072359

§ 371 (c)(1),
(2), (4) Date: Nov. 24, 2008

(87) PCT Pub. No.: WO2008/065921

PCT Pub. Date: Jun. 5, 2008

(65) Prior Publication Data

US 2009/0208759 A1    Aug. 20, 2009

(30) Foreign Application Priority Data

Dec. 1, 2006 (JP) .............................. 2006-325683

(51) Int. Cl.
*B32B 7/12* (2006.01)
*C09J 4/00* (2006.01)

(52) U.S. Cl. .............................. 428/355 N; 428/355 R; 428/423.1; 156/331.4; 528/65

(58) Field of Classification Search ............... 156/331.4; 528/65; 526/80, 84; 521/116, 117; 428/343, 428/355 R, 355 N, 423.1

See application file for complete search history.

(56) References Cited

U.S. PATENT DOCUMENTS 7,431,794 B2 *  10/2008  Kanagawa et al. ....... 156/331.4

FOREIGN PATENT DOCUMENTS

| EP | 0331215 | 9/1989 |
|---|---|---|
| JP | 03-167356 | 7/1991 |
| JP | 2002-327310 | 11/2002 |
| JP | 2003049147 | 2/2003 |
| JP | 2003-246830 | 9/2003 |
| JP | 2005-290280 | 10/2005 |

* cited by examiner

*Primary Examiner*—Thao T. Tran
(74) *Attorney, Agent, or Firm*—Darby & Darby P.C.

(57) ABSTRACT

There are provided a moisture-curable polyurethane hot melt adhesive containing a urethane prepolymer obtained by reacting a polyol (A) with a polyisocyanate (B), wherein the polyol (A) contains 40 to 80 mass % of a polycarbonate polyol (a1), 5 to 40 mass % of polytetramethylene glycol (a2), and 5 to 40 mass % of a polyester polyol (a3) obtained by reacting a polycarboxylic acid containing an aliphatic polycarboxylic acid and an aromatic polycarboxylic acid with a polyether polyol obtained by adding an alkylene oxide to bisphenol A, based on the total amount of the polyol (A), and a multilayer sheet using this adhesive. This adhesive can maintain excellent adhesion strength even after washing is repeatedly performed under stringent washing conditions without impairing soft texture of a multilayer sheet.

6 Claims, 1 Drawing Sheet

MOISTURE-CURABLE POLYURETHANE HOT MELT ADHESIVE AND MULTILAYER SHEET USING THE SAME

CROSS REFERENCE TO RELATED APPLICATION

This is the U.S. national phase application under 35 U.S.C. § 371 of International Patent Application No. PCT/JP2007/072359, filed Nov. 19, 2007 and claims the benefit of Japanese Application No. 2006-325683, filed Dec. 1, 2006. The International Application was published in Japanese on Jun. 5, 2008 as International Publication No. WO 2008/065921 under Article 21(2), and all preceding applications are incorporated herein in their entirety.

TECHNICAL FIELD

The present invention relates to an adhesive usable for adhesion of, for example, fibrous substrates used for production of clothes, shoes, bags, seats of vehicles and the like, and a multilayer sheet obtained using the adhesive.

BACKGROUND ART

Various functionalities such as waterproofness and cold protection in addition to soft texture are required for fiber products such as clothes depending on the purpose of use. For example, excellent waterproofness is required for sports wears such as mountaineering wears for the purpose of preventing penetration of rainwater or the like, and in the case of jobs requiring wearing of specific uniforms as in policemen and firemen, properties such as cold protection and thermal insulation are required for the uniforms and the like in some cases. Further, barrier properties for preventing soil of beds and futons due to excretion such as urine in addition to good touch feeling and prevention of stuffiness are required for sheets used for hospital beds and the like in some cases.

As fiber products such as clothes and sheets provided with such properties, for example, a multilayer sheet, which is obtained by selecting a plurality of fibrous substrates or resin films depending on the required properties and stacking them is known.

As the above multilayer sheet, there is known, for example, a wear for cold protection and thermal insulation including an adhered laminate of raised fabric or pile fabric and a permeable polymer film, wherein the permeable polymer film is stacked on and adhered onto the raised surface or pile surface of the fabric with a curing reaction type-adhesive interposed therebetween, the weight of the wear is 50 g to 400 g per $m^2$ and the amount of the adhesive applied is 2 g to 30 g per $m^2$, and the permeable polymer film surface is positioned on the front surface side of the wear (see, for example, Japanese Patent Laying-Open No. 2002-327310).

Further, as the curing reaction-type adhesive usable for production of the above wear for cold protection and thermal insulation, it is known that a moisture-curable hot melt adhesive containing a urethane prepolymer can be used, and it is also known that the above polymer film and the above fabric are adhered by the curing reaction-type adhesive applied in a dot pattern, and thereby a wear having a good heat retaining property without impairing soft texture required for a wear can be obtained.

However, a multilayer sheet obtained using the above conventional moisture-curable polyurethane hot melt adhesive sometimes caused reduction in adhesion strength of the adhesive by repeated water washing or dry cleaning, thereby causing separation between substrates constituting the multilayer sheet.

Therefore, the development of an adhesive which can exhibit excellent adhesion strength for various substrates and hardly causes separation between substrates even when water washing or dry cleaning is repeatedly performed has been progressed. As such an adhesive, there is known, for example, a reactive hot melt adhesive obtained by reacting a polyisocyanate (A) with a polyol (B), wherein the polyol (B) contains a polyolefin polyol (C), a xylene resin (D), rosins (E), a polyester polyol (F) and a polyether polyol (G) as essential components (see, for example, Japanese Patent Laying-Open No. 2005-290280).

Meanwhile, cleanliness at an extremely high level and excellent sanitary conditions are required for sheets used for beds and futons of a hospital, and therefore the sheets are separately handled from general household washes in many cases. As the washing method, there is known a method in which general water washing is performed, and then high temperature washing is performed at generally 50 to 90° C. using a detergent, an alkaline agent, a bleach and the like, and sterilization and disinfection treatment is successively performed under pressure at high temperature. Such a washing method generally referred to as "industrial washing" significantly reduces adhesion strength of an adhesive used for production of a multilayer sheet in some cases due to a large load applied to a multilayer sheet such as sheets as compared with usual water washing, dry cleaning or the like.

Here, in the case of a multilayer sheet produced using the above reactive hot melt adhesive, separation between substrates could be prevented to some extent even when water washing or dry cleaning was repeatedly performed. However, when the multilayer sheet was repeatedly subjected to industrial washing, the adhesion strength of the reactive hot melt adhesive was significantly reduced and thereby separation between substrates was caused in some cases.

As described above, there has not yet been found under the present circumstances an adhesive which can exhibit such a level of adhesion strength that the separation between substrates constituting a multilayer sheet is not caused and does not impair soft texture of clothes and the like even when washing is repeatedly performed under stringent washing conditions.

DISCLOSURE OF THE INVENTION

Problems to be Solved by the Invention

A problem to be solved by the present invention is to provide a moisture-curable polyurethane hot melt adhesive which can maintain excellent adhesion strength even after usual water washing, dry cleaning or the like is repeatedly performed without impairing soft texture of a multilayer sheet and also can maintain excellent adhesion strength even after washing is repeatedly performed under stringent washing conditions such as disinfection washing described above, and a multilayer sheet using the adhesive.

Means for Solving the Problems

In order to solve the above problem, the present inventors considered that it is important to enhance the adhesion strength of a moisture-curable polyurethane hot melt adhesive, and pursued the investigation. Since the composition of a polyol constituting a urethane prepolymer is largely important for the adhesion strength of an adhesive, the investigation was pursued by focusing on using a polycarbonate polyol generally known as a polyol capable of imparting excellent adhesion strength, as the polyol.

However, even in the case of an adhesive excellent in adhesion strength, when it was repeatedly subjected to the effect of water, an organic solvent or the like used during washing, the adhesion strength was gradually reduced in some cases. Therefore, a moisture-curable polyurethane hot melt adhesive containing a urethane prepolymer obtained by combining polytetramethylene glycol generally known as a polyol capable of imparting good hydrolysis resistance with the polycarbonate polyol, and reacting the combination with a polyisocyanate has been investigated.

The above adhesive did not cause significant reduction in adhesion strength even after water washing, dry cleaning, or industrial washing, and therefore hardly caused separation between substrates constituting a fiber product. However, an adhesive layer formed by the adhesive became very hard in some cases as compared with conventional ones, and therefore the soft texture of a fibrous substrate, a resin film or the like constituting a multilayer sheet was impaired in some cases. A method in which an adhesive is applied onto a substrate and the like in a dot pattern is known from the viewpoint of preventing deterioration in the texture, but even when such a method was applied, it was still difficult to maintain soft texture of a multilayer sheet.

The present inventors have considered that the reason why the soft texture of a multilayer sheet is impaired in the case of using the above adhesive is insufficient compatibility between polyols such as a polycarbonate polyol and a polytetramethylene glycol, and therefore they have investigated to compatibilize these polyols with each other as much as possible.

During pursuing the investigation, they have considered that a polyester polyol, obtained by reacting a polyether polyol that is an alkylene oxide adduct of bisphenol A with an aliphatic polycarboxylic acid and an aromatic polycarboxylic acid, contributes to the above compatibility of polyols, and therefore they have investigated an adhesive containing a urethane prepolymer obtained by reacting the polyester polyol, the polycarbonate polyol and polytetramethylene glycol with a polyisocyanate.

In the case of the above adhesive, it did not impair excellent soft texture derived from a substrate and a multilayer sheet using the substrate could maintain excellent adhesion strength even after water washing was repeatedly performed. However, when a multilayer sheet using the adhesive was repeatedly subjected to dry cleaning or industrial washing, significant reduction in adhesion strength was caused in some cases.

Therefore, during pursuing the investigation in order to satisfy both of the maintenance of soft texture of a multilayer sheet and the prevention of reduction in adhesion strength after various washing operations, they have found that a moisture-curable polyurethane hot melt adhesive, containing a urethane prepolymer obtained by reacting a polyol component that is the combination of a polycarbonate polyol, the above specific polyester polyol and polytetramethylene glycol having an amount used in a specific ratio range with a polyisocyanate component, can solve the problem of the present invention.

That is, the present invention relates to a moisture-curable polyurethane hot melt adhesive containing a urethane prepolymer obtained by reacting a polyol (A) with a polyisocyanate (B), wherein the polyol (A) contains 40 to 80 mass % of a polycarbonate polyol (a1), 5 to 40 mass % of polytetramethylene glycol (a2), and 5 to 40 mass % of a polyester polyol (a3) obtained by reacting a polycarboxylic acid containing an aliphatic polycarboxylic acid and an aromatic polycarboxylic acid with a polyether polyol obtained by adding an alkylene oxide to bisphenol A, based on the total amount of the polyol (A).

Further, the present invention relates to a multilayer sheet in which a first fibrous substrate and a second fibrous substrate or a resin film are adhered with an adhesive layer interposed therebetween, wherein the adhesive layer is a cured product of the moisture-curable polyurethane hot melt adhesive, and to clothes using the sheet.

Effects of the Invention

The moisture-curable polyurethane hot melt adhesive of the present invention does not impair the texture of a multilayer sheet such as fiber products and can maintain excellent adhesion strength even when the multilayer sheet is repeatedly subjected to water washing, dry cleaning or industrial washing, and therefore can be used for producing, for example, not only sports wears but also sheets for beds and futons, scrub suits, military uniforms and the like.

DESCRIPTION OF THE REFERENCE SIGNS

1, 2: Multilayer sheet;
11, 21: First substrate;
12, 22: Second substrate;
13, 23: Adhesive layer

BEST MODES FOR CARRYING OUT THE INVENTION

The moisture-curable polyurethane hot melt adhesive of the present invention is a moisture-curable polyurethane hot melt adhesive containing a urethane prepolymer obtained by reacting a polyol (A) with a polyisocyanate (B), wherein the polyol (A) contains 40 to 80 mass % of a polycarbonate polyol (a1), 5 to 40 mass % of polytetramethylene glycol (a2), and 5 to 40 mass % of a polyester polyol (a3) obtained by reacting a polycarboxylic acid containing an aliphatic polycarboxylic acid and an aromatic polycarboxylic acid with a polyether polyol obtained by adding an alkylene oxide to bisphenol A, based on the total amount of the polyol (A).

The above urethane prepolymer is a compound having, in its molecule, an isocyanate group which can form a crosslinked structure by reacting with moisture present in air or a substrate to which the prepolymer is applied and has the property of being solid or viscous at ordinary temperatures. Generally, many of compounds referred to as the "urethane prepolymer" are those having a relatively low molecular weight, but a compound having a number average molecular weight (Mn) of tens of thousands is also referred to as the "urethane prepolymer" by those of skill in the art, and a urethane prepolymer having a number average molecular weight of tens of thousands can also be used in the present invention.

The number average molecular weight of the above urethane prepolymer is preferably in the range of 500 to 30000, and more preferably in the range of 1000 to 10000. When the number average molecular weight of a urethane prepolymer is in the above range, a moisture-curable polyurethane hot melt adhesive excellent in fluidity and processability can be obtained.

Further, the content of isocyanate groups present in the above urethane prepolymer (NCO mass %) is preferably in the range of 0.5 to 8.0 mass %, and more preferably in the range of 1 to 5 mass %.

Further, the above urethane prepolymer has two properties of a "moisture-curable property" and a "hot melt property".

The above moisture-curable property is derived from a crosslinking reaction which is initiated by reacting an isocyanate group possessed by the urethane prepolymer with moisture (water) and is a property caused by the isocyanate group possessed by the urethane prepolymer. The polyurethane hot melt adhesive of the present invention can be cured and formed into a high molecular weight compound by the function of this moisture-curable property, and as a result, an adhesive layer excellent in durability and the like can be formed.

On the other hand, the above hot melt property is a property caused by the molecular structure of the prepolymer selected, and is the generic name of a nature or a material which has the property of being solid or viscous at ordinary temperatures, but of being melted to be a fluid or liquid state by heating, and for example, hot melt materials represented by an ethylene-vinyl acetate copolymer are generally known. A hot melt adhesive is generally a solventless type and the adhesive which is made to be in a melted state by heating is applied onto a substrate and can exhibit cohesion by cooling it, and therefore is useful as, for example, an adhesive or a coating material.

The melt viscosity of the urethane prepolymer at 125° C. measured by a cone-plate viscometer is preferably in the range of 500 mPa·s to 50000 mPa·s and more preferably in the range of 1000 mPa·s to 30000 mPa·s. In the case of a urethane prepolymer having a hot melt viscosity in the above range, not only operational stability when the adhesive of the present invention is applied onto a substrate or the like becomes good, but also an adhesive layer which is more uniform and has good adhesion strength to a substrate can be formed because the adhesive does not excessively penetrate into the substrate.

The above hot melt property has a close relationship with a softening point, and there is generally a tendency that the lower the softening point of the urethane prepolymer used is, the better the workability is, and on the contrary, the higher the softening point is, the better the adhesion strength is.

The softening point of the urethane prepolymer used in the present invention is preferably in the range of 40° C. to 120° C. When the softening point of the urethane prepolymer is in such a range, the workability is also good, and a moisture-curable polyurethane hot melt adhesive excellent in adhesion strength can be obtained. It is to be noted that the "softening point" as referred to in the present invention means the temperature at which a urethane prepolymer starts to thermally flow to lose cohesion when the temperature thereof is raised stepwise.

As an adjustment method of the softening point of the urethane prepolymer, there can be adopted, for example, (1) an adjustment method by the molecular weight of a urethane prepolymer; (2) an adjustment method, in the case of using a polyester polyol as a raw material, by control of the crystallinity of the polyester polyol or the amount of the crystalline polyester polyol used; (3) an adjustment method by introduction of an aromatic ring structure into a polyol or a polyisocyanate; and (4) an adjustment method by the content of a urethane bond, and these methods can be used alone or in combination of a plurality of them.

In the adjustment method of the above (1), the softening point generally tends to increase along with the increase in the molecular weight of a urethane prepolymer. It is to be noted that for adjustment of the molecular weight of a urethane prepolymer, for example, techniques such as adjustment by the molar ratio of a polyisocyanate to a polyol and the use of a high molecular weight polyol can be adopted, and the adjustment method is not particularly limited.

Further, in the adjustment method of the above (2), there is generally a tendency that the larger the number of carbon atoms on the polyalkylene chain of a crystalline polyester polyol is, the more improved the crystallinity of the urethane prepolymer obtained, and therefore the softening point is increased. In addition, there is also a tendency that the larger the amount of the crystalline polyester polyol used is, the more the softening point increases.

Further, in the adjustment method of the above (3), there is usually a tendency that the larger the content of an aromatic ring structure in a urethane prepolymer is, the more the softening point increases.

Further, in the adjustment method of the above (4), there is usually a tendency that the larger the content of a urethane bond is, the more the softening point increases.

The urethane prepolymer used in the present invention can be produced by reacting various polyols (A) and various polyisocyanates (B) described below in the condition where the content of isocyanate groups possessed by the polyisocyanate (B) exceeds that of hydroxyl groups possessed by the polyol (A). Thereby, isocyanate groups are remained in the urethane prepolymer, and therefore a moisture-curable property is imparted to the urethane prepolymer.

The polyol (A) used for producing the urethane prepolymer contains a polycarbonate polyol (a1) in the range of 40 to 80 mass %. The polycarbonate polyol (a1) means a polymer having a carbonate bond in its main chain and two or more hydroxyl groups in its molecule.

The amount of the polycarbonate polyol (a1) used is preferably 50 mass % or more, and more preferably 60 mass % or more and 70 mass % or less, based on the polyol (A). The polycarbonate polyol (a1) is used in the above range, and thereby good heat resistance and hydrolysis resistance can be imparted to an adhesive layer formed by curing the moisture-curable polyurethane hot melt adhesive of the present invention. Accordingly, in the case of the adhesive of the present invention obtained by using the polycarbonate polyol (a1) in the above range, excellent adhesion strength can be maintained even when a multilayer sheet obtained using the adhesive is repeatedly subjected to water washing or industrial washing.

On the other hand, when the amount of the polycarbonate polyol (a1) used is less than 40 mass %, the resulting adhesive may cause significant reduction in adhesion strength in some cases when a multilayer sheet using the adhesive is repeatedly subjected to industrial washing.

The number average molecular weight of the polycarbonate polyol (a1) is preferably in the range of 650 to 10000 and more preferably in the range of 1000 to 5000. When the number average molecular weight is 650 or more, better heat resistance and hydrolysis resistance can be imparted to an adhesive layer formed by the moisture-curable polyurethane hot melt adhesive of the present invention. On the other hand, when the number average molecular weight is 10000 or less, flexibility or texture of the adhesive layer is hardly impaired, and operational processability when the moisture-curable polyurethane hot melt adhesive is produced or applied onto a substrate becomes good. It is to be noted that the "number average molecular weight" as referred to in the present invention is measured by a gel permeation chromatography (GPC) method and is a value calculated in terms of polystyrene.

As the polycarbonate polyol (a1), a poly(alkylene carbonate)diol obtained by condensation reaction of a low molecular weight polyol with one or two or more substances selected from a diaryl carbonate, a dialkyl carbonate and an alkylene carbonate, and the like can be used.

As the above low molecular weight polyol, for example, one or two or more substances selected from ethylene glycol, 1,2-propylene glycol, 1,3-propylene glycol, 1,3-butanediol, 1,4-butanediol, 2,2-dimethyl-1,3-propanediol, 1,6-hexanediol, 3-methyl-1,5-pentanediol, 1,8-octanediol, diethylene glycol, triethylene glycol, dipropylene glycol, tripropylene glycol, cyclohexane-1,4-diol and cyclohexane-1,4-dimethanol can be used. It is to be noted that the low molecular weight polyol can also be used as a part of the polyol (A) in the present invention.

As the above diaryl carbonate, for example, one or two or more substances selected from diphenyl carbonate and dinaphthyl carbonate can be used.

As the above dialkyl carbonate, for example, one or two or more substances selected from dimethyl carbonate, diethyl carbonate and dibutyl carbonate can be used.

As the above alkylene carbonate, for example, one or two or more substances selected from ethylene carbonate and propylene carbonate can be used.

As the polycarbonate polyol (a1), a polycarbonate polyol obtained by reacting a polyol containing 1,4-butanediol with a dialkylene carbonate such as dimethylene carbonate is preferably used from the viewpoint of further improving the adhesion strength of the resulting adhesive.

The polyol (A) used for production of the urethane prepolymer contains polytetramethylene glycol (a2) in the range of 5 to 40 mass %. The polytetramethylene glycol (a2) is used in the above range and thereby an adhesive capable of forming an adhesive layer having good hydrolysis resistance can be obtained. Further, in the case of such an adhesive, excellent adhesion strength can be maintained even when the multilayer sheet using the adhesive is repeatedly subjected to water washing or dry cleaning.

The amount of the polytetramethylene glycol (a2) used is preferably in the range of 20 to 30 mass % based on the total amount of the polyol (A) for further improving the hydrolysis resistance of the adhesive obtained.

The number average molecular weight of the polytetramethylene glycol (a2) is preferably in the range of 500 to 5000 and more preferably in the range of 1000 to 3000. When the number average molecular weight is 500 or more, particularly good hydrolysis resistance can be imparted to the adhesive layer. When the number average molecular weight is 5000 or less, the adhesive layer has particularly good flexibility or texture, and operational processability when a moisture-curable polyurethane hot melt adhesive is produced or applied onto a substrate becomes good.

The polyol (A) used for production of the above urethane prepolymer contains a polyester polyol (a3) obtained by reacting a polycarboxylic acid containing an aliphatic polycarboxylic acid and an aromatic polycarboxylic acid with a polyether polyol obtained by adding an alkylene oxide to bisphenol A in the range of 5 to 40 mass %. The polyester polyol (a3) contributes to improving the compatibility between the polycarbonate polyol (a1) and the polytetramethylene glycol (a2). An adhesive capable of forming an adhesive layer which is excellent in transparency and hardly impairs soft texture when used for production of a multilayer sheet can be obtained by improving the compatibility of the polyol (A). Further, the above various polyols are compatible with each other and thereby various physical properties such as uniform and stable adhesion strength can be imparted to the moisture-curable polyurethane hot melt adhesive obtained.

It is more preferred that the content of the polyester polyol (a3) is 10 mass % or more and 30 mass % or less based on the total amount of the polyol (A).

The number average molecular weight of the polyester polyol (a3) is preferably in the range of 500 to 5000 and more preferably in the range of 1000 to 3000. When the number average molecular weight is 500 or more, the moisture-curable polyurethane hot melt adhesive of the present invention has particularly good coating workability. When the number average molecular weight is 5000 or less, the adhesive layer has particularly good adhesion strength.

Further, the glass transition temperature of the polyester polyol (a3) is preferably in the range of −50° C. to 40° C. because a moisture-curable polyurethane hot melt adhesive capable of forming an adhesive layer having good bendability, particularly low temperature bendability can be obtained.

The glass transition temperature can be adjusted by appropriately changing the composition of the polyester polyol (a3) and for example, it can be adjusted to the glass transition temperature in the above range by adjusting the amount of an alkylene oxide added to bisphenol A. It is to be noted that the "glass transition temperature" as referred to herein represents an endothermic peak temperature measured at a rate of temperature increase of 5° C./min from −80° C. under a nitrogen atmosphere using a DSC (differential scanning calorimetric analyzer).

The polyester polyol (a3) can be produced by, for example, condensation reaction of a polycarboxylic acid containing an aliphatic polycarboxylic acid and an aromatic polycarboxylic acid with a polyether polyol having an alkylene oxide added to bisphenol A.

It is important for improving the compatibility between the polycarbonate polyol (a1) and the polytetramethylene glycol (a2) and the initial cohesion of the adhesive of the present invention to use an aliphatic polycarboxylic acid and an aromatic polycarboxylic acid in combination as the above polycarboxylic acid. For example, when only one of an aliphatic polycarboxylic acid or an aromatic polycarboxylic acid is used, the compatibility between the polycarbonate polyol (a1) and the polytetramethylene glycol (a2) may be reduced in some cases, and as a result, the reduction in soft texture and transparency of the adhesive layer formed and further in adhesion strength after various washing operations may be caused in some cases.

As the above aliphatic polycarboxylic acid, for example, succinic acid, maleic acid, adipic acid, glutaric acid, pimelic acid, suberic acid, azelaic acid, sebacic acid and dodecane dicarboxylic acid can be used. Among them, an aliphatic polycarboxylic acid having 6 to 10 carbon atoms is preferably used from the viewpoint of obtaining the adhesive of the present invention capable of forming an adhesive layer having excellent flexibility without causing reduction in adhesion strength after various washing operations. Specifically, sebacic acid, adipic acid and dodecane dicarboxylic acid are preferably used.

As the above aromatic polycarboxylic acid, for example, phthalic acid, isophthalic acid and terephthalic acid can be used, and among them, isophthalic acid is preferably used.

The ratio of the aliphatic polycarboxylic acid and the aromatic polycarboxylic acid used is preferably an equivalent ratio of 10/90 to 50/50 from the viewpoints of improving the compatibility between the polycarbonate polyol (a1) and the polytetramethylene glycol (a2) and obtaining an adhesive capable of forming an adhesive layer having excellent flexibility without causing reduction in adhesion strength after various washing operations.

Further, as the above polycarboxylic acid, other polycarboxylic acids such as a polycarboxylic acid containing an aliphatic ring structure may be used in combination, if necessary.

Further, as a polyol which is allowed to react with the polycarboxylic acid, a polyether polyol having an alkylene oxide added to bisphenol A is used. For example, the polyether polyol can be produced by adding an alkylene oxide thereto by a known conventional method using bisphenol A as an initiator.

As the above alkylene oxide, for example, ethylene oxide and propylene oxide can be used, and among them, propylene oxide is preferably used.

The alkylene oxide is added in an amount of preferably 1 mol to 10 mol and more preferably 2 mol to 8 mol, based on 1 mol of bisphenol A. A polyether polyol having an alkylene oxide added to bisphenol A in the above range is used, and thereby a moisture-curable polyurethane hot melt adhesive capable of forming an adhesive layer having excellent flexibility without causing reduction in adhesion strength after various washing operations can be obtained.

As the polyester polyol (a3), a polyester polyol obtained by condensation reaction of a polyether polyol obtained by adding 4 mol to 8 mol of a propylene oxide to 1 mol of bisphenol A with sebacic acid and isophthalic acid is particularly preferably used for improving the compatibility between the polycarbonate polyol (a1) and the polytetramethylene glycol (a2) and obtaining an adhesive capable of forming an adhesive layer having excellent flexibility without causing reduction in adhesion strength after various washing operations.

It is preferred that the polyol (A) used for production of the urethane prepolymer further contains a polyether polyol (a4) having three or more hydroxyl groups, if necessary, in addition to the polycarbonate polyol (a1), the polytetramethylene glycol (a2) and the polyester polyol (a3). The polyether polyol (a4) increases the crosslink density of the adhesive layer formed by a moisture-curable polyurethane hot melt adhesive and imparts good mechanical strength.

The content of the polyether polyol (a4) is preferably in the range of 0.5 to 5.0 mass % and more preferably 1 to 3 mass %, based on the total amount of the polyol (A). When the content is 0.5 mass % or more, the adhesive layer obtained has a particularly good crosslink density improving effect, and when the content is 5 mass % or less, the crosslink density of the adhesive layer is not too high, and therefore the flexibility or texture of the adhesive layer can be well maintained.

The number average molecular weight of the polyether polyol (a4) is preferably in the range of 500 to 5000 and more preferably in the range of 700 to 3000. When the number average molecular weight is 500 or more, it is preferred in that the durability of the adhesive layer can be improved, and when the number average molecular weight is 5000 or less, it is preferred in that the thermal stability and coating workability of the adhesive can be improved.

As the polyether polyol (a4), for example, one in which ethylene oxide, propylene oxide or the like is added to glycerin, trimethylolpropane, pentaerythritol or the like can be used. Among them, a polyether polyol having three hydroxyl groups in the molecule is preferably used for further improving the adhesion strength of the adhesive of the present invention, and specifically, one in which propylene oxide is added to glycerin is more preferably used.

The polyol (A) used for producing the urethane prepolymer may contain other polyols, if necessary, in addition to the above polyols, and for example, polyether polyols other than the above polyether polyols, polyester polyols, acrylic polyols, polyolefin polyols, castor oil polyols, silicon-modified polyols or a mixture of these polyols can be used in combination.

As the polyisocyanate (B) used when the urethane prepolymer is produced, there can be used, for example, aromatic diisocyanates such as phenylene diisocyanate, tolylene diisocyanate, 4,4'-diphenylmethane diisocyanate, 2,4'-diphenylmethane diisocyanate, naphthalene diisocyanate and xylylene diisocyanate; aliphatic diisocyanates or alicyclic diisocyanates such as hexamethylene diisocyanate, lysine diisocyanate, cyclohexane diisocyanate, isophorone diisocyanate, dicyclohexylmethane diisocyanate and tetramethylxylylene diisocyanate; and dimers or trimers of 4,4'-diphenylmethane diisocyanate. In the case of a blank substrate, xylylene diisocyanate is preferably used from the viewpoint of preventing deterioration in aesthetic appearance due to yellowing of an adhesive layer. On the other hand, when it is intended to improve the mechanical strength of a urethane prepolymer or the reactivity with water vapor or moisture (that is, water), 4,4'-diphenylmethane diisocyanate is particularly preferably used.

The urethane prepolymer can be produced by a known conventional method. For example, the polycarbonate polyol (a1), the polytetramethylene glycol (a2) and the polyester polyol (a3) and, if necessary, other polyols such as the polyether polyol (a4), from which moisture is removed, are separately added dropwise or a mixture of them is added dropwise or collectively supplied to the polyisocyanate (B) in a reaction vessel, and then the resulting mixture is heated and reacted until the hydroxyl groups possessed by these polyols are substantially consumed, and thereby the urethane prepolymer can be produced.

Further, the urethane prepolymer can also be produced by a so-called continuous extrusion reaction system, in which the polyol (A) and the polyisocyanate (B) which are heated in advance are charged into an extruder at a predetermined ratio.

The production of the urethane prepolymer can be usually performed under solvent-free condition, but the urethane prepolymer may also be produced in an organic solvent. When it is produced in an organic solvent, there can be used organic solvents such as ethyl acetate, n-butyl acetate, methyl ethyl ketone and toluene which do not inhibit the reaction between the polyol (A) and the polyisocyanate (B). When an organic solvent is used, it is necessary to remove the organic solvent by a method such as heating under reduced pressure during the reaction or after completion of the reaction.

The ratio of the amount of the polyol (A) and the polyisocyanate (B) used is preferably adjusted so that the equivalent ratio of isocyanate groups in the polyisocyanate (B) and hydroxyl groups in the polyol (A) [NCO/OH] is in the range of 1.1 to 5.0, and more preferably in the range of 1.2 to 3.0. When the equivalent ratio is 1.1 or more, the moisture-curable polyurethane hot melt adhesive has good moisture curability and an adhesive layer excellent in mechanical strength can be formed. On the other hand, when the equivalent ratio is 5.0 or less, the urethane prepolymer obtained has good chemical stability.

When the urethane prepolymer is produced, a urethanization catalyst can be used, if necessary. The urethanization catalyst can be appropriately used at an arbitrary step during the above reaction process.

As the above urethanization catalyst, there can be used, for example, nitrogen-containing compounds such as triethylamine, triethylenediamine and N-methyl morpholine; potassium acetate, zinc stearate, stannous octylate, di-n-butyltin diacetate, di-n-butyltin dilaurate, 1,8-diazabicyclo(5,4,0)undecene-7 (DBU), DBU-p-toluenesulfonate, DBU-formate, DBY-octylate, DBU-phenolate, an amine-based catalyst, a morpholine-based catalyst, bismuth nitrate, tin chloride and iron chloride, and dibutyltin dilaurate.

The urethane prepolymer obtained by the above method is aged for 5 days under the environment of an environmental temperature of 23° C. and a relative humidity of 65% in a state where it is applied onto a substrate at a thickness of 50 μm to give a cured product, and thereby the obtained cured product has a glass transition temperature (Tg) preferably in the range of −30° C. to 60° C., and more preferably in the range of −10° C. to 40° C. In the case of a urethane prepolymer capable of forming a cured product having a glass transition temperature in the above range, a moisture-curable polyurethane hot melt adhesive capable of maintaining excellent adhesion strength even after various washing operations and forming an adhesive layer having soft texture can be obtained. It is to be noted that the "glass transition temperature" is a value measured as the peak temperature (unit: ° C.) of a loss tangent (tan δ) obtained by measuring at a frequency of 1 Hz and a rate of temperature increase of 5° C./min by a dynamic viscoelasticity measuring apparatus (manufactured by Rheometric Scientific Inc.).

For example, the urethane prepolymer obtained by the above method and other components, if necessary, are mixed using a batch stirrer, a static mixing apparatus such as a static mixer, or a mixing apparatus such as those of a rotor stator type, and thereby the moisture-curable polyurethane hot melt adhesive of the present invention can be produced.

During the above mixing, a urethane prepolymer is preferably in a heated and melted state, and specifically, more preferably in a state where it is heated and melted by heating at 60° C. to 170° C.

Further, the moisture-curable polyurethane hot melt adhesive of the present invention can contain, if necessary, for example, at least one or a combination of two or more selected from additives such as a silane coupling agent, a filler, a thixotropy-imparting agent, a tackifier, a wax, a thermal stabilizer, a light stabilizer, a fluorescent whitener and a foaming agent, a thermoplastic resin, a thermosetting resin, a dye, a conductivity-imparting agent, an antistatic agent, a moisture permeability improver, a water-repellant, an oil-repellant, a hollow foam, a compound containing water of crystallization, a flame retardant, a desiccant, a moisture absorber, a deodorant, a foam stabilizer, an anti-foaming agent, a mildewproofing agent, an antiseptic, an anti-algae agent, a pigment dispersant, an inert gas, an anti-blocking agent and an antihydrolysis agent. Further, for the purpose of improving water absorption properties to facilitate moisture curing, the moisture-curable polyurethane hot melt adhesive can contain one or a combination of two or more water-soluble organic compounds and/or water-soluble inorganic compounds.

As the silane coupling agent, there can be used, for example, γ-glycidoxypropyltrimethoxysilane, γ-glycidoxypropylmethyldiethoxysilane, β-(3,4-epoxycyclohexyl)ethyltrimethoxysilane, γ-methacryloxypropyltrimethoxysilane, γ-mercaptopropyltrimethoxysilane, vinyltrimethoxysilane and γ-chloropropyltrimethoxysilane.

As the filler, there can be used, for example, calcium carbonate, aluminum hydroxide, barium sulfate, kaolin, talc, carbon black, alumina, magnesium oxide, inorganic balloon, organic balloon, lithia tourmaline and activated carbon.

As the thixotropy-imparting agent, there can be used, for example, surface-treated calcium carbonate, fine powder silica, bentonite and zeolite.

When the above other components are used, it is preferred that the preset temperature of an apparatus for mixing the other components and the urethane prepolymer is usually not less than the melt temperature of the urethane prepolymer and not more than [the melt temperature +30° C.]. When the preset temperature of the apparatus is in the above range, the urethane prepolymer and the other components can be uniformly stirred and mixed. In addition, the increase in viscosity by the thermal history of the adhesive obtained can also be prevented.

It is to be noted that when a moisture-curable polyurethane hot melt adhesive is produced by stirring and mixing, air bubbles generated in an apparatus are preferably appropriately removed by defoaming treatment using a vacuum pump or the like.

The multilayer sheet of the present invention is one in which a first fibrous substrate and a second fibrous substrate or a resin film are adhered with an adhesive layer interposed therebetween, and the adhesive layer is one obtained by curing the moisture-curable polyurethane hot melt adhesive by a moisture crosslinking reaction.

Figure 1:
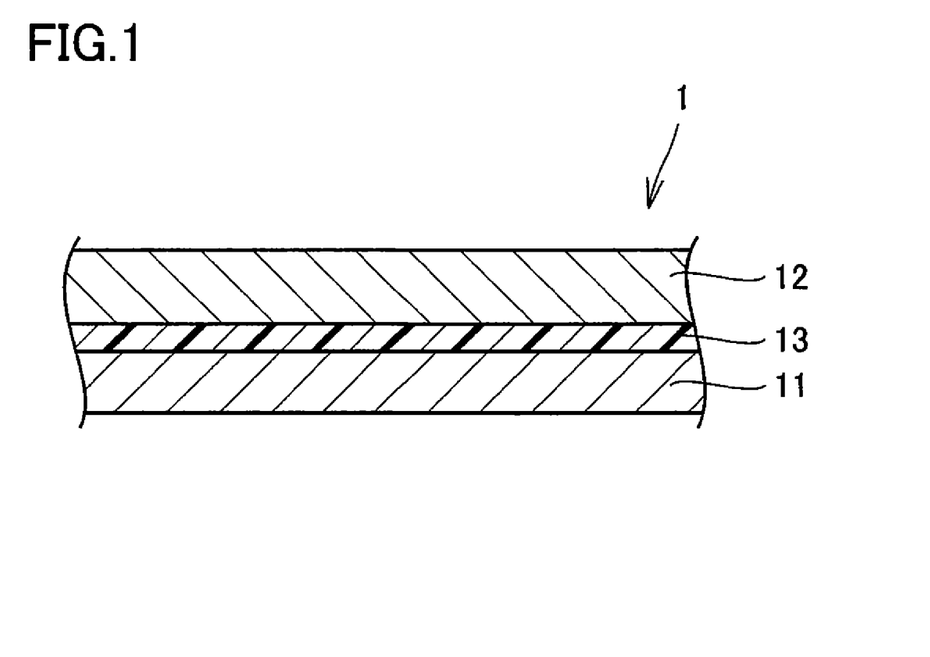
FIG. 1 is a cross-sectional view showing an example of a multilayer sheet of the present invention.
Figure 2:
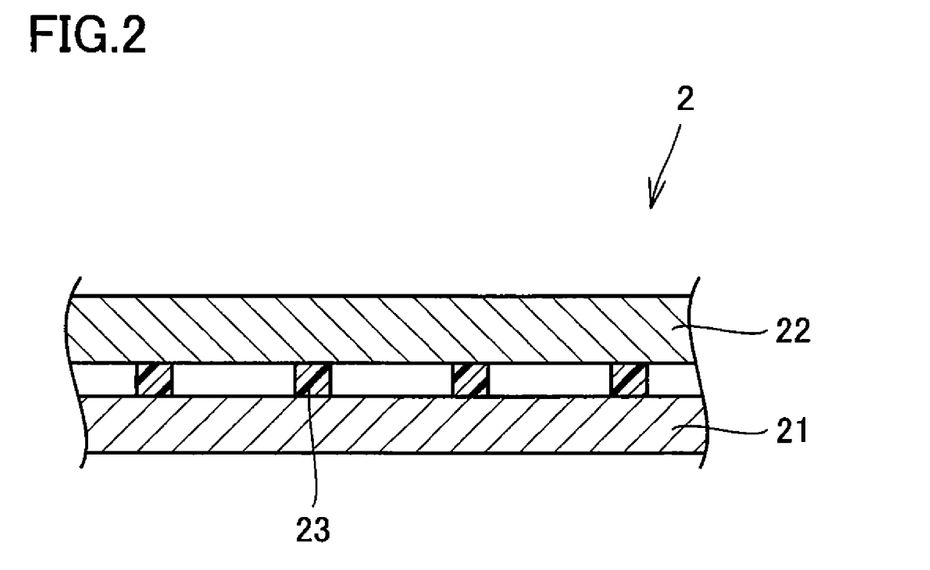
FIG. 2 is a cross-sectional view showing another example of a multilayer sheet of the present invention.

FIG. 1 and FIG. 2 are cross-sectional views each showing an example of a multilayer sheet of the present invention. In a multilayer sheet 1 shown in FIG. 1, a first substrate 11 and a second substrate 12 are adhered with an adhesive layer 13 formed by crosslinking the moisture-curable polyurethane hot melt adhesive of the present invention interposed therebetween. Further, in a multilayer sheet 2 shown in FIG. 2, a first substrate 21 and a second substrate 22 are adhered with an adhesive layer 23 formed by crosslinking the moisture-curable polyurethane hot melt adhesive of the present invention interposed therebetween. Adhesive layer 13 is formed so that the entire surfaces of first substrate 11 and second substrate 12 are adhered to each other, and adhesive layer 23 is formed so that only the partial surfaces of first substrate 21 and second substrate 22 are adhered to each other, and for example, intermittently applied in a circular dot or grid-dot pattern.

As the first substrate usable for producing the multilayer sheet of the present invention, a fibrous substrate can be mentioned. As the fibrous substrate, non-woven fabric, woven fabric, knitted fabric, pile fabric and the like can be used. In addition, as a fiber constituting the fibrous substrate, for example, a polyester fiber, a nylon fiber, a polyamide fiber, a polyurethane fiber, a polyolefin fiber, a polyacrylic fiber and a polyfluorocarbon fiber can be used. Among them, a substrate made of at least one of a polyester fiber and a nylon fiber is particularly preferably used.

On the other hand, as the second substrate usable for producing the multilayer sheet, a fibrous substrate or a resin film can be used.

As the fibrous substrate, substrates similar to those exemplified as the first substrate can be used.

Further, as a substrate made of a resin film, for example, a polyurethane resin film, a fluorine resin film, a polyolefin resin film, a polyester resin film and a polyamide resin film can be used. Among them, a substrate made of at least one of a polyurethane resin film and a fluorine resin film is preferably used.

As the above substrate made of the resin film, various substrates can be used depending on the purpose of use of the multilayer sheet obtained, but for example, a permeable film which does not allow a liquid such as water to permeate and allows a gas such as water vapor to permeate can also be used. As the permeable film, for example, the film having a moisture permeability in the range of 5000 to 50000 g/m²·24 h is preferably used. It is to be noted that the moisture permeability in the present invention is a value measured by a method in accordance with an A-1 method described in JIS L-1099.

An example of the most typical combination of the substrate constituting the multilayer sheet of the present invention is a combination in which the first substrate is made of at least one of a polyester fiber and a nylon fiber and the second substrate is made of at least one of a polyurethane resin film and a fluorine resin film. A multilayer sheet in which such first substrate and second substrate are adhered to each other with a moisture-curable polyurethane hot melt adhesive can be preferably used for, for example, clothes such as sports wears and shoes upper materials.

Further, the first substrate and the second substrate each may be of a single layer or a plurality of layers. As a substrate including a plurality of layers, for example, one in which different resin films are stacked on each other in advance can be used.

The multilayer sheet of the present invention can be produced by, for example, the following method.

Firstly, the moisture-curable polyurethane hot melt adhesive which is heated and melted at a temperature of generally 60° C. to 170° C. is applied onto either one of the first substrate or the second substrate.

The above application method is preferably a method in which the adhesive is applied in a dot pattern from the viewpoint of not impairing the soft texture of the substrate. When the adhesive is applied in a dot pattern, the amount applied is preferably in the range of 5 g/m² to 20 g/m² based on the area of the substrate.

Further, preferable examples of an apparatus usable for the application include a roll coater, a spray coater, a T-die coater, a knife coater, and a comma coater. Especially, a gravure coater is preferably used for applying the moisture-curable polyurethane hot melt adhesive in a dot pattern.

The moisture-curable polyurethane hot melt adhesive in a heated and melted state is applied in a dot pattern onto a substrate, and then the other substrate is placed on the surface of the substrate on which the adhesive has been applied, and a moisture curing reaction is proceeded under the clamping condition, and thereby the multilayer sheet of the present invention can be produced.

The condition in which the moisture-curable polyurethane hot melt adhesive is moisture-cured is different depending on the temperature of the work environment and the like, but examples thereof include, for example, the condition of a temperature of 18° C. to 40° C., a relative humidity of 50% to 90% and a curing time of 24 hours to 72 hours. The reaction between the isocyanate groups in the urethane prepolymer and moisture can be sufficiently proceeded by performing the moisture curing reaction under such a condition, and as a result, even when water washing, dry cleaning or industrial washing is repeatedly performed, a multilayer sheet which hardly causes the separation between substrates can be obtained.

The thickness of an adhesive layer constituting the multilayer sheet is, for example, preferably in the range of 5 μm to 200 μm, and more preferably in the range of 50 μm to 150 μm from the viewpoint of preventing the separation between substrates after various washing operations without impairing the soft texture of the multilayer sheet.

The adhesive layer constituting the multilayer sheet preferably has a 100% modulus in the range of 2.0 MPa to 8.0 MPa and more preferably a 100% modulus in the range of 3.0 MPa to 6.0 MPa from the viewpoint of preventing the separation between substrates after various washing operations without impairing the soft texture of the multilayer sheet. It is to be noted that the "100% modulus" means a value in which the modulus of a film of 5 mm in width×7 cm in length×150 μm in thickness fabricated by moisture-curing the moisture-curable polyurethane hot melt adhesive at a temperature of 23° C. and a relative humidity of 65% for 5 days is measured at a head speed of 300 mm/min using TENSILON in accordance with JIS K7311.

EXAMPLES

Hereinafter, the present invention will be further specifically described with reference to examples. The evaluation of various properties in Examples and Comparative Examples was performed according to the following methods.

<Number Average Molecular Weight (Mn)>

The number average molecular weight (Mn) was measured by a gel permeation chromatography (GPC) method and calculated in terms of polystyrene.

<Melt Viscosity>

The value of melt viscosity (mPa·s) is a value obtained by measuring the melt viscosity when a urethane prepolymer is made to be in a heated and melted state at 125° C. using a cone-plate viscometer (manufactured by ICI).

<NCO Mass %>

Excess dimethylamine was added to a urethane prepolymer to react the isocyanate groups with dimethylamine, and then the amount of the remaining dimethylamine was determined by a back titration method using hydrochloric acid, and thereby the content of isocyanate groups (NCO mass %) in the urethane prepolymer was calculated.

<100% Modulus, Stress at Break and Elongation at Break>

A moisture-curable polyurethane hot melt adhesive was moisture-cured at a temperature of 23° C. and a relative humidity of 65% for 5 days, and thereby a film of 5 mm in width×7 cm in length×50 μm in thickness was fabricated. The 100% modulus, the stress at break and the elongation at break of the obtained film were measured using TENSILON (manufactured by Shimadzu Corporation, head speed: 300 mm/min) in accordance with JIS K7311.

<Peel Strength>

(Normal Peel Strength Before Washing)

A one inch-wide hot melt cloth tape was heated at 130° C. for 5 seconds and fused to a substrate made of a polycarbonate film from the viewpoint of preventing the rupture of the substrate made of a polycarbonate film constituting a multilayer sheet, and the resulting substrate was used as a test piece. The normal peel strength of the test piece before washing was measured under the condition of a temperature of 23° C. and a relative humidity of 65% using TENSILON (manufactured by Shimadzu Corporation, head speed: 200 m/min) in accordance with JIS K6854-2. It is to be noted that the peel strengths of a multilayer sheet after each test of a water washing resistance test, a dry cleaning resistance test and an industrial washing resistance test which are shown below were measured using a test piece obtained by heating and fusing a hot melt cloth tape in the same manner as the above.

(Peel Strength After Water Washing Resistance Test)

Water washing of each multilayer sheet was performed 50 times in accordance with JIS L 1089-1970 and the appearance and peel strength after washing were evaluated. The appearance was visually evaluated according to the following criteria. Further, the peel strength was evaluated by the above method.

Evaluation Criteria of Appearance
A: No separation was observed.
B: Slight partial separation was observed.
C: A half or more of the adhered area was separated.
(Peel Strength After Dry Cleaning Resistance Test)

Dry cleaning in which the process of 6-minute washing using perclen as a solvent and subsequent 6-minute drying is taken as one cycle was performed in 50 cycles for each multilayer sheet, and thereafter the appearance change and the peel strength were evaluated. Here, the appearance was visually evaluated according to the following criteria. In addition, the peel strength was evaluated by the above method.

Evaluation Criteria of Appearance
A: No separation was observed.
B: Slight partial separation was observed.
C: A half or more of the adhered area was separated.
(Peel Strength After Industrial Washing Resistance Test)

Industrial washing (disinfection washing) in which the process of washing in a solution at 85° C. containing 35 mass % industrial hydrogen peroxide water (3 ml/l) and sodium percarbonate (1.5 g/l) for 15 minutes and subsequent water washing for 10 minutes followed by drying at 110° C. under a pressure of 1 atm for 10 minutes was taken as one cycle was performed in 50 cycles for each multilayer sheet, and thereafter the appearance change and the peel strength were evaluated. Here, the appearance was visually evaluated according to the following criteria. In addition, the peel strength was evaluated by the above method.

Evaluation Criteria of Appearance
A: No separation was observed.
B: Slight partial separation was observed.
C: A half or more of the adhered area was separated.
(Texture)

Feeling when each multilayer sheet was bent by hand was evaluated according to the following criteria.

Evaluation Criteria
1: Very soft
2: Slightly soft
3: Soft
4: Slightly hard
5: Hard <Preparation of Moisture-Curable Polyurethane Hot Melt Adhesive>
(Synthesis of Polyester Polyol (I-1) Obtained by Reacting a Polyether Polyol Obtained by Adding an Alkylene Oxide to Bisphenol A with a Polycarboxylic Acid)

To 1 mol of bisphenol A, 6 mol of propylene oxide was added to synthesize an alkylene oxide adduct of bisphenol A, which was reacted with sebacic acid and isophthalic acid as polycarboxylic acids in an equivalent ratio of 30/70 to obtain a polyester polyol (I-1) having a number average molecular weight of 2000.

(Synthesis of Polyester Polyol (I-2) Obtained by Reacting a Polyether Polyol Obtained by Adding an Alkylene Oxide to Bisphenol A with a Polycarboxylic Acid)

To 1 mol of bisphenol A, 6 mol of propylene oxide was added to synthesize an alkylene oxide adduct of bisphenol A, which was reacted with adipic acid and isophthalic acid as polycarboxylic acids in an equivalent ratio of 30/70 to obtain a polyester polyol (I-2) having a number average molecular weight of 2000.

(Synthesis of Polyester Polyol (I-3) Obtained by Reacting a Polyether Polyol Obtained by Adding an Alkylene Oxide to Bisphenol A with a Polycarboxylic Acid)

To 1 mol of bisphenol A, 6 mol of propylene oxide was added to synthesize an alkylene oxide adduct of bisphenol A, which was reacted with sebacic acid and terephthalic acid as polycarboxylic acids in an equivalent ratio of 30/70 to obtain a polyester polyol (I-3) having a number average molecular weight of 2000.

(Synthesis of Polyester Polyol (I-4) Obtained by Reacting a Polyether Polyol Obtained by Adding an Alkylene Oxide to Bisphenol A with a Polycarboxylic Acid)

To 1 mol of bisphenol A, 6 mol of propylene oxide was added to synthesize an alkylene oxide adduct of bisphenol A, which was reacted with sebacic acid as a polycarboxylic acid to obtain a polyester polyol (I-4) having a number average molecular weight of 2000.

(Synthesis of Polyester Polyol (I-5) Obtained by Reacting a Polyether Polyol Obtained by Adding an Alkylene Oxide to Bisphenol A with a Polycarboxylic Acid)

To 1 mol of bisphenol A, 6 mol of propylene oxide was added to synthesize an alkylene oxide adduct of bisphenol A, which was reacted with isophthalic acid as a polycarboxylic acid to obtain a polyester polyol (I-5) having a number average molecular weight of 2000.

Example 1

Into a 1 L four-neck flask was placed a polyol component containing 10 parts by mass of polytetramethylene glycol (hereinafter, abbreviated as "PTMG") having a number average molecular weight of 2000, 70 parts by mass of polycarbonate polyol (hereinafter, abbreviated as "PC"), and 20 parts by mass of the polyester polyol (I-1), and the polyol component was heated at 100° C. under reduced pressure and dehydrated until the water content became 0.03 mass %.

Next, the inside of the four-neck flask was cooled to 70° C., and then 25 parts by mass of 4,4'-diphenylmethane diisocyanate (hereinafter, abbreviated as "MDI") was added thereto, and further 0.01 parts by mass of di-n-butyltin dilaurate as a catalyst was added, and thereafter the temperature was raised to 110° C. and the resulting mixture was reacted for 3.0 hours until the content of isocyanate groups became constant, and thereby a moisture-curable polyurethane hot melt adhesive containing a urethane prepolymer (1) was obtained.

The above adhesive had a melt viscosity of 2800 mPa·s at 125° C. In addition, the adhesive had a melt viscosity of 5600 mPa·s at 125° C. after the urethane prepolymer (1) was subjected to heat treatment at 120° C. for 48 hours. Further, the adhesive had a content of isocyanate groups in the urethane prepolymer (1) of 3.2 mass % and a glass transition temperature (Tg) of 47° C.

Example 2

A moisture-curable polyurethane hot melt adhesive containing a urethane prepolymer (2) was obtained in the same manner as in Example 1 except that 20 parts by mass of PTMG, 60 parts by mass of PC and 20 parts by mass of the polyester polyol (I-1) were used in place of the polyol component used in Example 1.

The above adhesive had a melt viscosity of 2600 mPa·s at 125° C., a melt viscosity of 5800 mPa·s at 125° C. after heat treatment at 120° C. for 48 hours, a content of isocyanate groups in the urethane prepolymer (2) of 3.2 mass % and a glass transition temperature (Tg) of 42° C.

Example 3

A moisture-curable polyurethane hot melt adhesive containing a urethane prepolymer (3) was obtained in the same manner as in Example 1 except that 30 parts by mass of PTMG, 50 parts by mass of PC and 20 parts by mass of the polyester polyol (I-1) were used in place of the polyol component used in Example 1.

The above adhesive had a melt viscosity of 3200 mPa·s at 125° C., a melt viscosity of 5500 mPa·s at 125° C. after heat treatment at 120° C. for 48 hours, a content of isocyanate groups in the urethane prepolymer (3) of 3.2 mass % and a glass transition temperature (Tg) of 35° C.

Example 4

A moisture-curable polyurethane hot melt adhesive containing a urethane prepolymer (4) was obtained in the same manner as in Example 1 except that 30 parts by mass of PTMG, 45 parts by mass of PC and 25 parts by mass of the polyester polyol (I-1) were used in place of the polyol component used in Example 1.

The above adhesive had a melt viscosity of 3800 mPa·s at 125° C., a melt viscosity of 6400 mPa·s at 125° C. after heat treatment at 120° C. for 48 hours, a content of isocyanate groups in the urethane prepolymer (4) of 3.2 mass % and a glass transition temperature (Tg) of 38° C.

Example 5

A moisture-curable polyurethane hot melt adhesive containing a urethane prepolymer (5) was obtained in the same manner as in Example 1 except that 20 parts by mass of PTMG, 59 parts by mass of PC, 20 parts by mass of the polyester polyol (I-1) and 1.0 part by mass of a propylene oxide adduct of glycerin (number average molecular weight: 700) as trifunctional polypropylene glycol (hereinafter, abbreviated as "trifunctional PPG") were used in place of the polyol component used in Example 1.

The above adhesive had a melt viscosity of 3000 mPa·s at 125° C., a melt viscosity of 6100 mPa·s at 125° C. after heat treatment at 120° C. for 48 hours, a content of isocyanate groups in the urethane prepolymer (5) of 3.2 mass % and a glass transition temperature (Tg) of 42° C.

Example 6

A moisture-curable polyurethane hot melt adhesive containing a urethane prepolymer (6) was obtained in the same manner as in Example 1 except that 19 parts by mass of PTMG, 57.5 parts by mass of PC, 19 parts by mass of the polyester polyol (I-1) and 4.5 parts by mass of trifunctional PPG were used in place of the polyol component used in Example 1.

The above adhesive had a melt viscosity of 3200 mPa·s at 125° C., a melt viscosity of 9000 mPa·s at 125° C. after heat treatment at 120° C. for 48 hours, a content of isocyanate groups in the urethane prepolymer (6) of 3.2 mass % and a glass transition temperature (Tg) of 43° C.

Example 7

A moisture-curable polyurethane hot melt adhesive containing a urethane prepolymer (7) was obtained in the same manner as in Example 1 except that the polyester polyol (I-2) was used in place of the polyester polyol (I-1) used in Example 1.

The above adhesive had a melt viscosity of 2600 mPa·s at 125° C., a melt viscosity of 5300 mPa·s at 125° C. after heat treatment at 120° C. for 48 hours, a content of isocyanate groups in the urethane prepolymer (7) of 3.1 mass % and a glass transition temperature (Tg) of 48° C.

Example 8

A moisture-curable polyurethane hot melt adhesive containing a urethane prepolymer (8) was obtained in the same manner as in Example 1 except that the polyester polyol (I-3) was used in place of the polyester polyol (I-1) used in Example 1.

The above adhesive had a melt viscosity of 2800 mPa·s at 125° C., a melt viscosity of 5500 mPa·s at 125° C. after heat treatment at 120° C. for 48 hours, a content of isocyanate groups in the urethane prepolymer (8) of 3.1 mass % and a glass transition temperature (Tg) of 50° C.

Comparative Example 1

A moisture-curable polyurethane hot melt adhesive containing a urethane prepolymer (9) was obtained in the same manner as in Example 1 except that 40 parts by mass of PTMG, 30 parts by mass of PC and 30 parts by mass of the polyester polyol (I-1) were used in place of the polyol component used in Example 1.

The above adhesive had a melt viscosity of 3500 mPa·s at 125° C., a melt viscosity of 6000 mPa·s at 125° C. after heat treatment at 120° C. for 48 hours, a content of isocyanate groups in the urethane prepolymer (9) of 3.2 mass % and a glass transition temperature (Tg) of −10° C.

Comparative Example 2

A moisture-curable polyurethane hot melt adhesive containing a urethane prepolymer (10) was obtained in the same manner as in Example 1 except that 35 parts by mass of PC, 35 parts by mass of PTMG and 30 parts by mass of the polyester polyol (I-1) were used in place of the polyol component used in Example 1.

The above adhesive had a melt viscosity of 2200 mPa·s at 125° C., a melt viscosity of 4600 mPa·s at 125° C. after heat treatment at 120° C. for 48 hours, a content of isocyanate groups in the urethane prepolymer (10) of 3.1 mass % and a glass transition temperature (Tg) of −5.0° C.

Comparative Example 3

A moisture-curable polyurethane hot melt adhesive containing a urethane prepolymer (I-1) was obtained in the same manner as in Example 1 except that 90 parts by mass of PC, 5 parts by mass of PTMG and 5 parts by mass of the polyester polyol (I-1) were used in place of the polyol component used in Example 1.

The above adhesive had a melt viscosity of 2800 mPa·s at 125° C., a melt viscosity of 4600 mPa·s at 125° C. after heat treatment at 120° C. for 48 hours, a content of isocyanate groups in the urethane prepolymer (11) of 3.1 mass % and a glass transition temperature (Tg) of 49° C.

Comparative Example 4

A moisture-curable polyurethane hot melt adhesive containing a urethane prepolymer (12) was obtained in the same manner as in Example 1 except that 70 parts by mass of PC, 10 parts by mass of PTMG and 20 parts by mass of the polyester polyol (I-4) were used in place of the polyol component used in Example 1.

The above adhesive had a melt viscosity of 2000 mPa·s at 125° C., a melt viscosity of 4000 mPa·s at 125° C. after heat treatment at 120° C. for 48 hours, a content of isocyanate groups in the urethane prepolymer (12) of 3.1 mass % and a glass transition temperature (Tg) of 47° C.

Comparative Example 5

A moisture-curable polyurethane hot melt adhesive containing a urethane prepolymer (13) was obtained in the same manner as in Example 1 except that 70 parts by mass of PC, 10 parts by mass of PTMG and 20 parts by mass of the polyester polyol (I-5) were used in place of the polyol component used in Example 1.

The above adhesive had a melt viscosity of 2200 mPa·s at 125° C., a melt viscosity of 4800 mPa·s at 125° C. after heat treatment at 120° C. for 48 hours, a content of isocyanate groups in the urethane prepolymer (13) of 3.2 mass % and a glass transition temperature (Tg) of 48° C.

Comparative Example 6

A moisture-curable polyurethane hot melt adhesive containing a urethane prepolymer (14) was obtained in the same manner as in Example 1 except that 40 parts by mass of PTMG and 60 parts by mass of PC were used in place of the polyol component used in Example 1.

The above adhesive had a melt viscosity of 3400 mPa·s at 125° C., a melt viscosity of 6800 mPa·s at 125° C. after heat treatment at 120° C. for 48 hours, a content of isocyanate groups in the urethane prepolymer (14) of 3.2 mass % and a glass transition temperature (Tg) of 37° C.

Comparative Example 7

A moisture-curable polyurethane hot melt adhesive containing a urethane prepolymer (15) was obtained in the same manner as in Example 1 except that 80 parts by mass of PC and 20 parts by mass of the polyester polyol (I-1) were used in place of the polyol component used in Example 1.

The above adhesive had a melt viscosity of 3000 mPa·s at 125° C., a melt viscosity of 7000 mPa·s at 125° C. after heat treatment at 120° C. for 48 hours, a content of isocyanate groups in the urethane prepolymer (15) of 3.2 mass % and a glass transition temperature (Tg) of 40° C.

Comparative Example 8

A moisture-curable polyurethane hot melt adhesive containing a urethane prepolymer (16) was obtained in the same manner as in Example 1 except that 59.5 parts by mass of PTMG, 39.5 parts by mass of the polyester polyol (I-1) and 1.0 part by mass of trifunctional PPG were used in place of the polyol component used in Example 1.

The above adhesive had a melt viscosity of 3300 mPa·s at 125° C., a melt viscosity of 6500 mPa·s at 125° C. after heat treatment at 120° C. for 48 hours, a content of isocyanate groups in the urethane prepolymer (16) of 3.2 mass % and a glass transition temperature (Tg) of −37° C.

Comparative Example 9

A moisture-curable polyurethane hot melt adhesive containing a urethane prepolymer (17) was obtained in the same manner as in Example 1 except that 100 parts by mass of PC was used in place of the polyol component used in Example 1.

The above adhesive had a melt viscosity of 2600 mPa·s at 125° C., a melt viscosity of 5200 mPa·s at 125° C. after heat treatment at 120° C. for 48 hours, a content of isocyanate groups in the urethane prepolymer (17) of 3.2 mass % and a glass transition temperature (Tg) of 50° C.

Comparative Example 10

A moisture-curable polyurethane hot melt adhesive containing a urethane prepolymer (18) was obtained in the same manner as in Example 1 except that 100 parts by mass of PTMG was used in place of the polyol component used in Example 1.

The above adhesive had a melt viscosity of 3000 mPa·s at 125° C., a melt viscosity of 6500 mPa·s at 125° C. after heat treatment at 120° C. for 48 hours, a content of isocyanate groups in the urethane prepolymer (18) of 3.1 mass % and a glass transition temperature (Tg) of −50° C.

Comparative Example 11

A moisture-curable polyurethane hot melt adhesive containing a urethane prepolymer (19) was obtained in the same manner as in Example 1 except that 100 parts by mass of the polyester polyol (I-1) was used in place of the polyol component used in Example 1.

The above adhesive had a melt viscosity of 2400 mPa·s at 125° C., a melt viscosity of 4800 mPa·s at 125° C. after heat treatment at 120° C. for 48 hours, a content of isocyanate groups in the urethane prepolymer (19) of 3.1 mass % and a glass transition temperature (Tg) of −10° C.

<Production of Multilayer Sheet>

A solution of a polycarbonate resin in a mixed solvent of methyl ethyl ketone, toluene and dimethylformamide was applied onto releasing paper, which was dried to obtain a film made of the polycarbonate resin with a thickness of 20 μm. Each of the moisture-curable polyurethane hot melt adhesives of Examples and Comparative Examples described above was applied in a grid-dot pattern onto the above film so as to have a coating amount of 20 g/m².

Next, pile fabric was adhered onto the applied surface and the resulting laminate was aged at a temperature of 23° C. and a relative humidity of 65% for 3 days in a state where it was clamped at 0.3 MPa, and thereby the moisture-curable polyurethane hot melt adhesive was moisture-cured to fabricate a multilayer sheet.

Various physical properties of the obtained multilayer sheet were evaluated by the above methods. The evaluation results are shown in the following tables.

TABLE 1

|  |  | Example 1 | Example 2 | Example 3 | Example 4 | Example 5 |
|---|---|---|---|---|---|---|
| PC | Part by | 70 | 60 | 50 | 45 | 59 |
| PTMG | mass | 10 | 20 | 30 | 30 | 20 |
| Polyester polyol (I-1) |  | 20 | 20 | 20 | 25 | 20 |

TABLE 1-continued

|  | Example 1 | Example 2 | Example 3 | Example 4 | Example 5 |
|---|---|---|---|---|---|
| Trifunctional PPG | — | — | — | — | 1 |
| MDI | 25 | 25 | 25 | 25 | 25 |
| NCO/OH (Equivalent ratio) | 2.0 | 2.0 | 2.0 | 2.0 | 2.0 |
| 100% Modulus (MPa) | 4.0 | 3.2 | 2.2 | 2.0 | 3.0 |
| Stress at break (MPa) | 45 | 42 | 43 | 42 | 40 |
| Elongation at break (%) | 820 | 860 | 860 | 820 | 880 |
| Normal peel strength before washing (kgf/inch) | 3.5 | 3.2 | 3.3 | 3.2 | 3.4 |
| Texture | 2 | 1 | 1 | 1 | 1 |
| Appearance after water washing | A | A | A | A | A |
| Peel strength after water washing (kgf/inch) | 3.5 | 3.2 | 3.1 | 3.2 | 3.3 |
| Appearance after dry cleaning | A | A | A | A | A |
| Peel strength after dry cleaning (kgf/inch) | 3.5 | 3.2 | 3.0 | 3.1 | 3.3 |
| Appearance after industrial washing | A | A | A | A | A |
| Peel strength after industrial washing (kgf/inch) | 3.2 | 3.0 | 2.8 | 2.8 | 3.4 |

TABLE 2

|  |  | Example 6 | Example 7 | Example 8 | Comparative Example 1 | Comparative Example 2 |
|---|---|---|---|---|---|---|
| PC | Part by mass | 57.5 | 70 | 70 | 30 | 35 |
| PTMG |  | 19 | 10 | 10 | 40 | 35 |
| Polyester polyol (I-1) |  | 19 | — | — | 30 | 30 |
| Polyester polyol (I-2) |  | — | 20 | — | — | — |
| Polyester polyol (I-3) |  | — | — | 20 | — | — |
| Trifunctional PPG |  | 4.5 | — | — | — | — |
| MDI |  | 25 | 25 | 25 | 25 | 25 |
| NCO/OH (Equivalent ratio) |  | 1.8 | 2.0 | 2.0 | 2.0 | 2.0 |
| 100% modulus (MPa) |  | 2.2 | 3.8 | 3.6 | 4.4 | 2.0 |
| Stress at break (MPa) |  | 42 | 43 | 44 | 40 | 40 |
| Elongation at break (%) |  | 825 | 780 | 800 | 860 | 830 |
| Normal peel strength before washing (kgf/inch) |  | 3.6 | 3.2 | 3.4 | 3.2 | 3.0 |
| Texture |  | 1 | 2 | 2 | 2 | 1 |
| Appearance after water washing |  | A | A | A | A | A |
| Peel strength after water washing (kgf/inch) |  | 3.5 | 3.2 | 3.4 | 3.2 | 3.0 |
| Appearance after dry cleaning |  | A | A | A | C | B |
| Peel strength after dry cleaning (kgf/inch) |  | 3.5 | 3.2 | 3.2 | 2.2 | 2.4 |
| Appearance after industrial washing |  | A | A | A | C | C |
| Peel strength after industrial washing (kgf/inch) |  | 3.5 | 3.2 | 3.2 | 1.1 | 1.2 |

TABLE 3

|  |  | Comparative Example 3 | Comparative Example 4 | Comparative Example 5 | Comparative Example 6 | Comparative Example 7 |
|---|---|---|---|---|---|---|
| PC | Part by mass | 90 | 70 | 70 | 60 | 80 |
| PTMG |  | 5 | 10 | 10 | 40 |  |
| Polyester polyol (I-1) |  | 5 | — | — | — | 20 |
| Polyester polyol (I-4) |  | — | 20 | — | — | — |
| Polyester polyol (I-5) |  | — | — | 20 | — | — |
| Trifunctional PPG |  | — | — | — | — | — |
| MDI |  | 25 | 25 | 25 | 25 | 25 |
| NCO/OH (Equivalent ratio) |  | 2.0 | 2.0 | 2.0 | 2.0 | 2.0 |
| 100% modulus (MPa) |  | 7.0 | 4.5 | 5.0 | 5.5 | 4.0 |
| Stress at break (MPa) |  | 42 | 30 | 35 | 39 | 50 |
| Elongation at break (%) |  | 760 | 620 | 610 | 660 | 670 |

TABLE 3-continued

|  | Comparative Example 3 | Comparative Example 4 | Comparative Example 5 | Comparative Example 6 | Comparative Example 7 |
|---|---|---|---|---|---|
| Normal peel strength before washing (kgf/inch) | 3.2 | 2.0 | 2.1 | 3.2 | 3.0 |
| Texture | 5 | 3 | 3 | 5 | 2 |
| Appearance after water washing | A | A | A | A | A |
| Peel strength after water washing (kgf/inch) | 3.2 | 1.9 | 2.0 | 3.2 | 3.0 |
| Appearance after dry cleaning | A | B | B | A | A |
| Peel strength after dry cleaning (kgf/inch) | 3.2 | 1.5 | 1.6 | 2.8 | 3.0 |
| Appearance after industrial washing | A | B | B | A | C |
| Peel strength after industrial washing (kgf/inch) | 3.2 | 1.5 | 1.5 | 3.0 | 1.2 |

TABLE 4

|  |  | Comparative Example 8 | Comparative Example 9 | Comparative Example 10 | Comparative Example 11 |
|---|---|---|---|---|---|
| PC | Part by | — | 100 | — | — |
| PTMG | mass | 59.5 | — | 100 | — |
| Polyester polyol (I-1) | | 39.5 | — | — | 100 |
| Polyester polyol (I-4) | | — | — | — | — |
| Polyester polyol (I-5) | | — | — | — | — |
| Trifunctional PPG | | 1 | | | |
| MDI | | 25 | 25 | 25 | 25 |
| NCO/OH (Equivalent ratio) | | 2.0 | 2.0 | 2.0 | 2.0 |
| 100% modulus (MPa) | | 3.5 | 6.0 | 4.0 | 2.0 |
| Stress at break (MPa) | | 43 | 35 | 55 | 45 |
| Elongation at break (%) | | 780 | 680 | 700 | 820 |
| Normal peel strength before washing (kgf/inch) | | 2.8 | 3.3 | 3.3 | 3.6 |
| Texture | | 3 | 5 | 5 | 1 |
| Appearance after water washing | | A | A | A | A |
| Peel strength after water washing (kgf/inch) | | 2.7 | 3.3 | 2.8 | 3.5 |
| Appearance after dry cleaning | | A | A | B | B |
| Peel strength after dry cleaning (kgf/inch) | | 2.6 | 3.3 | 1.5 | 1.6 |
| Appearance after industrial washing | | D | A | D | D |
| Peel strength after industrial washing (kgf/inch) | | 0.3 | 3.2 | 0.5 | 0.4 |

Note 1:
PTMG is polytetramethylene glycol (number average molecular weight: 2000).
Note 2:
PC is polycarbonate polyol (number average molecular weight: 2000).
Note 3:
Polyester polyol (I-1) is a polyester polyol (number average molecular weight: 2000) obtained by reacting a propylene oxide adduct of bisphenol A with sebacic acid and isophthalic acid.
Note 4:
Polyester polyol (I-2) is a polyester polyol (number average molecular weight: 2000) obtained by reacting a propylene oxide adduct of bisphenol A with adipic acid and isophthalic acid.
Note 5:
Polyester polyol (I-3) is a polyester polyol (number average molecular weight: 2000) obtained by reacting a propylene oxide adduct of bisphenol A with sebacic acid and terephthalic acid.
Note 6:
Polyester polyol (I-4) is a polyester polyol (number average molecular weight: 2000) obtained by reacting a propylene oxide adduct of bisphenol A with sebacic acid.
Note 7:
Polyester polyol (I-5) is a polyester polyol (number average molecular weight: 2000) obtained by reacting a propylene oxide adduct of bisphenol A with isophthalic acid.
Note 8:
Trifunctional PPG is trifunctional polypropylene glycol (propylene oxide adduct of glycerin) (number average molecular weight: 700).
Note 9:
MDI is 4,4'-diphenylmethane diisocyanate.

INDUSTRIAL APPLICABILITY

The moisture-curable polyurethane hot melt adhesive of the present invention and the multilayer sheet using the same can be preferably applied for the use of, for example, clothes such as sports wears, shoes, bags, seats of vehicles and the like, and leather-like sheets.

The invention claimed is:

1. A moisture-curable polyurethane hot melt adhesive containing a urethane prepolymer obtained by reacting a polyol (A) with a polyisocyanate (B), wherein the polyol (A) contains 40 to 80 mass % of a polycarbonate polyol (a1), 5 to 40 mass % of polytetramethylene glycol (a2), and 5 to 40 mass % of a polyester polyol (a3) obtained by reacting a polycarboxylic acid containing an aliphatic polycarboxylic acid and an aromatic polycarboxylic acid with a polyether polyol obtained by adding an alkylene oxide to bisphenol A, based on the total amount of the polyol (A).

2. The moisture-curable polyurethane hot melt adhesive according to claim 1, wherein the polyester polyol (a3) is obtained by reacting sebacic acid and isophthalic acid with a polyether polyol obtained by adding an alkylene oxide to bisphenol A.

3. The moisture-curable polyurethane hot melt adhesive according to claim 1, wherein the polyol (A) further contains 0.5 to 5.0 mass % of a polyether polyol (a4) having three or more hydroxyl groups.

4. The moisture-curable polyurethane hot melt adhesive according to claim 1, wherein the equivalent ratio of isocyanate groups possessed by the polyisocyanate (B) and hydroxyl groups possessed by the polyol (A) (isocyanate groups/hydroxyl groups) is in the range of 1.1 to 5.0.

5. A multilayer sheet in which a first fibrous substrate and a second fibrous substrate or a resin film are adhered with an adhesive layer interposed therebetween, wherein the adhesive layer is a cured product of the moisture-curable polyurethane hot melt adhesive according to claim 1.

6. The multilayer sheet according to claim 5, wherein the first fibrous substrate is a substrate made of at least one of a polyester fiber and a nylon fiber and the second fibrous substrate or the resin film is a polyurethane resin film or a fluorine resin film.

* * * * *